June 30, 1931. F. E. TERMAN 1,812,066

ELECTRIC DETECTOR AND FREQUENCY CHANGING SYSTEM

Filed March 7, 1927

Inventor
Frederick Emmons Terman
By Lyon & Lyon
Attorney

Patented June 30, 1931

1,812,066

UNITED STATES PATENT OFFICE

FREDERICK EMMONS TERMAN, OF STANFORD UNIVERSITY, CALIFORNIA

ELECTRIC DETECTOR AND FREQUENCY CHANGING SYSTEM

Application filed March 7, 1927. Serial No. 173,419.

The present invention relates to an apparatus for detecting an electrical current modulated upon a current of higher frequencies, and to a novel form of frequency changing system employing said detector.

Ordinarily, in the reception of wireless or radio waves, detection of the waves is accomplished by either the grid leak and grid condenser system or by the use of a negative bias upon the grid of the audion tube, a so-called "C battery" method. Where the detection is accomplished using the grid leak and grid condenser method, the efficiency is several times higher than that using the C battery system. However, detection using the grid leak and grid condenser is limited to where the frequency of the detected current is not more than about five thousand cycles per second. This is for the reason that as the frequency of the detected current increases, the grid condenser acts as a short circuit around the grid leak at the frequency being handled, with the result that no detection occurs between the grid and filament of the tube, and if any detection is obtained in the tube at these frequencies, it takes place between the filament and plate of the tube, which is the mode of operation of the ordinary C battery detection. The ordinary grid leak-condenser method of detection is operated for detection of ordinary audio frequencies, but when the frequency of the detected current is high, such for example as fifty thousand cycles per second, no detection with the grid leak and grid condenser system is obtained between the grid and filament of an audion tube, but the inefficient C battery detection is utilized, i. e., the detection occurring between the plate and filament. For this reason, the so-called first detector of a superheterodyne radio receiving circuit operates with very low efficiency, the first detector causing a loss in the signal strength so great that one or two stages of radio frequency amplification are generally necessary to restore the signal to its original strength.

It is the object of the present invention to provide a system of detection which will operate efficiently at any frequency of the detected current, producing efficient detection or rectification of the current in the grid filament path.

Another object of the present invention is to provide a frequency changing system for amplification of oscillatory electrical energy in which the change of frequency is accomplished without the usual high loss in signal strength.

The present invention, together with various objects and advantages thereof, will best be understood from a description of the new system of detection and frequency changing system embodying said system of detection, and a comparison thereof with the normal grid condenser and grid leak system of detection. For this purpose, there is hereinafter described a preferred form or forms of apparatuses and methods embodying the present invention, the same being described in connection with the accompanying drawings, in which, Figure 1 is a diagram illustrative of the grid leak-condenser method of detection.

Figure 6:
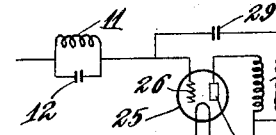

Figure 6 discloses a system of detection with a neutralizing means for preventing oscillation of the circuit.

Figure 7:
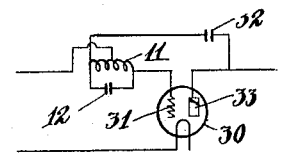

Figure 7 shows a modification of Fig. 6.

Figure 8:
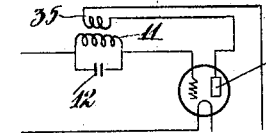

Figure 8 shows a similar modification, and

Figure 9:
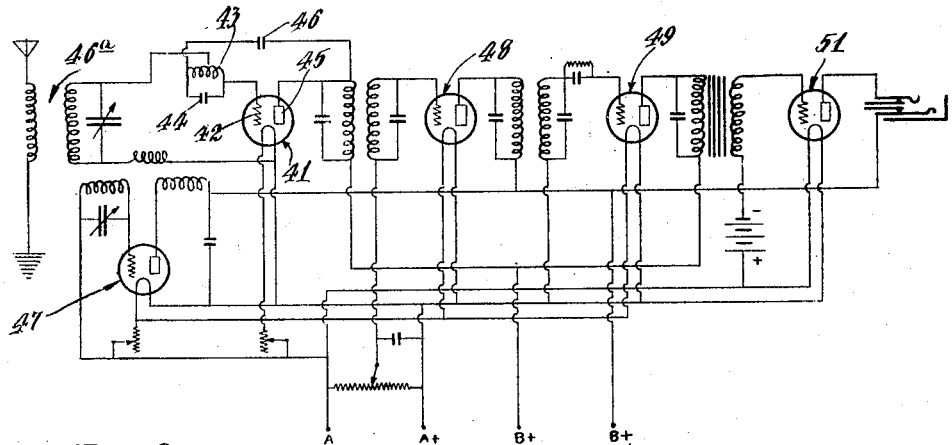

Figure 9 illustrates a complete frequency changing system embodied in the present invention.

Figure 1:
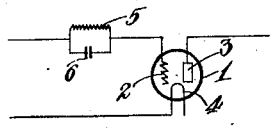

In order to understand the operation of the present method of detection, reference is first made to Fig. 1, which discloses the normal detection of the grid leak and grid condenser system. In such figure, 1 indicates a tri-electrode tube having a grid 2, plate 3 and filament 4. Connected in the circuit leading to the grid 2 is a high resistance 5 shunted by a capacity 6. In this type of detector, the grid condenser used should have at least five or ten times the capacity of the grid-to-filament capacity of the tube 1. At the same time, this condenser should not be too large. The resistance 5 is normally a high resistance, ranging from one-half to ten megohms.

In operation of such a system of detection, normally a small grid current flows through the grid leak 5 due to the normal grid potential that exists in the detector, the current passing to the filament 4. When a radio frequency voltage is applied to the detector, the grid condenser is practically a short circuit to this voltage so that the voltage is passed on and applied to the grid of the detecting tube. The result of this radio frequency voltage thus applied to the grid of the detecting tube is to cause an additional direct current to flow in the grid circuit. When the radio frequency voltage that is applied to the detector 1 varies in amplitude or is modulated, as is commonly called, for example, with an audio frequency current, the rectified current varies in amplitude in accordance with the fluctuations and amplitude of the radio frequency.

When two radio frequency voltages of different frequency are superimposed and applied to the detector tube 1, the rectified current that is produced will be an alternating current of the difference in frequency of the two radio frequency voltages. Also in addition to this difference frequency, there will be a sum frequency current. The rectified current that is produced by the application of radio frequency voltages to the detector must pass through the combination of grid leak and grid condensers 5 and 6, and in passing through this impedance will produce a voltage drop. This voltage drop changes the grid potential from the normal by an amount equal to the drop in the grid condenser-grid leak combination, and due to the amplifying action of the grid in the vacuum tube, the current from the plate 3 of the tube will vary in proportion to the change of the potential on the grid 2. In order, however, for any substantial effect to be produced, the impedance of the grid condenser and grid leak combination must be very high, usually in the order of a megohm or more. In this case, the rectified current will produce a considerable voltage drop in the grid circuit impedance made up of resistance 5 and condenser 6, and will accordingly produce a rather large change of grid potential, thereby giving a correspondingly effective detective action.

In case where the frequency of the rectified current is moderately high, such as about five thousand cycles per second, it is found that the minimum size of grid condenser that can be employed and still by-pass the applied radio frequency voltage is so large as to practically short circuit the grid leak relative to the converted current, and reduce the impedance of the grid leak 5 and grid condenser 6 to such a low value as to produce little or no voltage drop in this impedance; thereby the current from the plate 3 is not substantially affected and a poor detection action is obtained. At frequency such as fifty thousand cycles per second, there is practically no detector action going on in the grid circuit, and that detection which is normally obtained takes place in the circuit of the plate 3, and is due to the fact that the plate current is not proportionate to the volage applied to the grid 2. The rectifying action that takes place from this cause, however, is from six to fifteen times as inefficient as that which can be obtained by efficient rectification in the grid circuit.

The system of the present invention provides an efficient means for detection in that it embodies the following three essentials necessary in order to obtain good detection or rectification in the grid circuit of a detector. These conditions are:

(1) That the impedance that is placed in series with the grid of the detecting tube is low with respect to the frequency of the voltages that are applied to the detector to be rectified.

(2) That the impedance that is placed in the grid circuit is very high or offers a great opposition to the passage of the rectified current.

(3) That there is provided a passage whereby a steady normal grid current is present when no alternating voltage is applied to the grid.

As before explained, the ordinary grid leak-condenser method of detection fails to satisfy these requirements when the rectified current is not within the audio frequency range, since the grid condenser begins to by-pass the rectified currents of such frequencies.

Figure 2:
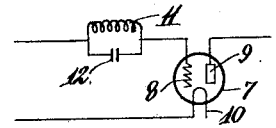
Figure 2 is a diagram of a method or system of detection of the present invention.

Now referring to Fig. 2 of the drawings, 7 indicates an audion tube with a grid 8, plate 9 and filament 10. In the circuit of the grid 8, there is placed an impedance 11, shunted by a condenser 12. The condenser 12 must ordinarily have a capacity as small as possible and still be capable of by-passing the frequency of the oscillatory energy applied to the grid 8. This means that the capacity should be at least three to five times as great as the capacity between the grid 8 and filament 10, which, in the case of the ordinary form of such tubes, needs a capacity of, for example, one hundred or two hundred micro-microfarads. The inductance 11 should possess such a value relative to the condenser 12 as to form a resonant circuit at the frequency of the rectified current to be formed in the tube 8. For example, in the case of a frequency changing circuit employing the so-called superheterodyne principle, the first detector must handle a rectified current of about fifty thousand cycles, and accordingly, with the present invention there will be placed an inductance and condenser combination in the grid circuit of the first detector which would be tuned to approximately fifty thousand cycles. In such a case the impedance offered by the inductance-condenser combination, 11 and 12, to the rectified current will be extremely high and can be made in the order of a megohm or greater; thereby, the system meets the second requirement of good detection.

When applying the circuit shown in Fig. 2 to the first detector of a frequency changing system, such as the superheterodyne, the rectified current normally contains a band of frequencies between five and ten thousand kilo-cycles in width, and hence the inductance-condenser combination 11 and 12 must be broad enough so that its impedance to the rectified current is approximately the same for the entire band of frequencies of the rectified current.

It is understood, of course, that the inductance capacity system of employing impedance to the rectified current in the grid, as illustrated in Fig. 2, is not necessarily limited to cases where the rectified current is high in frequency, but may be applied where the rectified current is of any frequency. For example, if the rectified frequency was low, such as one thousand cycles, the inductance 11 and condenser 12 should be tuned to such one thousand cycles. The system of detection or revivification illustrated in Fig. 2 meets the first requirement of good detection, since the capacity 12 offers substantially a short circuit to the ordinary range of radio frequencies or the ordinary frequency of the oscillator of a superheterodyne applied to the detector. Moreover, the inductance 11 provides a path for a steady discharge of current from the grid when no radio frequency voltage is applied to the detector tube 8.

It is understood that in practical construction a coil to produce the inductance 11 may possess sufficient internal capacity as to fulfill the requirement of the condenser 12 so that the coil operates both as the inductance 11 and condenser 12. Moreover, in any case, the capacity of the inductance-capacity combination must take into consideration the capacity of the coil employed as the inductance.

It is understood that the grid to filament capacity of the detector tube is generally so situated in relation to the inductance 11 as to be substantially in shunt with this inductance, and so this detector tube capacity is in parallel with condenser 12 and acts to increase the effective value of this capacity. Accordingly, in any case, the capacity of the inductance-capacity combination must take into consideration the capacity between the grid and filament of the detector tube. Also, the inductance-capacity combination must take into account the effect of the input circuit that supplies the detector with the alternating current voltage or voltages to be detected. This is necessary because the characteristics of this input circuit may in some circumstances affect the electrical characteristics of the grid circuit at the frequency of the converted current.

Figure 3:
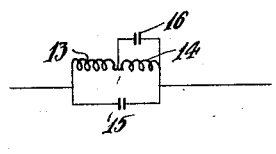
Figure 3 shows a modified system of detection.

Now referring to Fig. 3, a modified form of impedance for the grid is shown, in which the inductance is split into two portions 13 and 14, the entire inductance being shunted by a condenser 15, and the portion 14 being shunted by a condenser 16. In this case, the total values of inductances and capacities are the same for the similar purposes as that described in connection with the inductance-capacity combination of Fig. 2.

Figure 4:
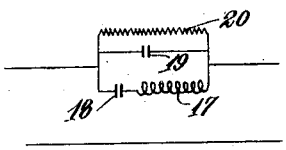
Figure 4 shows another modified system of detection.

Fig. 4 discloses a further modification in which an inductance 17 is used having in series therewith a condenser 18, this series being shunted by a condenser 19 and a grid leak 20. The combinations such as Figs. 3 and 4 offer advantage in certain cases in producing higher impedance to the converted current.

Figure 5:
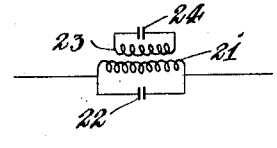
Figure 5 shows another modified system of detection.

In Fig. 5, a further modification of the impedance for the grid is illustrated, in which there is a coil 21 shunted by a condenser 22. The coil or inductance 21 is coupled to the inductance 23, shunted by the condenser 24. The coupled inductance adds its impedance into the main circuit with a multiplying factor determined by the amount of coupling, and facilitates the production of a high impedance to the converted or rectified current without substantial complications, and may be employed where difficulties are experienced in getting sufficient impedance for proper detection. In the modifications shown in Figs. 3, 4, and 5, it is possible by using proper values of the inductances and condensers, to form a combination which is resonant at a number of frequencies, and will therefore offer an extremely high impedance to currents of several frequencies, but will offer very low impedance to currents of all other frequencies, including those which lie between the resonant frequencies.

Now referring to Fig. 6, a circuit is illustrated which is adapted to eliminate the tendency of the apparatus to produce oscillations. It will be observed that with the detector system of the present invention, it will frequently occur that both the grid and plate circuits will be in resonance with the rectified current, and due to the tube capacity there will be present a tendency for the detector circuit to produce oscillations. For example, where the output of the detector of Figs. 2 and 5, inclusive, is to be amplified, as in a superheterodyne circuit, the plate circuit of the detector tube will be tuned to the frequency of the converted current, and if the converted current is sufficiently high in frequency, oscillations in the detector may be set up. Such difficulties may be avoided by several expedients. This may be accomplished either by inducing losses in the circuit to eliminate oscillation or by neutralizing the grid-to-plate capacity of the tube by any usual or preferred method. In Fig. 6, a detector tube 25 is indicated as having its grid 26 connected to an inductance-capacity combination similar to that illustrated in Fig. 2, and has its plate 27 connected with a transformer 28. The secondary of such transformer is connected through a capacity 29 back to the grid 26, the condenser 29 offering a voltage opposed to that of the feed back voltage in tube 25 for the purpose of eliminating undesirable oscillations.

In Fig. 7, neutralization is shown to be accomplished by using the so-called Rice method, 30 indicating a tube, 11 and 12 indicating the inductance condenser for the grid 31, and 32 indicates a condenser connected with the plate 33 of the tube and with the far side of the inductance 11.

In Fig. 8, oscillations are prevented by feeding back energy from the plate 34 to a coil 35 with the inductance 11 of the impedance combination 11, 12, said energy being opposed to that fed back to the capacity of the tube, and neutralization thus obtained.

It is understood that it is not always necessary or desirable to entirely neutralize the tendency of the detector system of the present invention to oscillate, inasmuch as a limited amount of regeneration is frequently useful. The detector therefore may be neutralized only sufficiently to prevent oscillations, and frequently regeneration may be intentionally introduced in a variety of ways.

In order to illustrate one example of a complete apparatus embodying the present invention in Fig. 9, there is illustrated a circuit diagram of a radio receiver of the frequency changing or superheterodyne type, employing a detector principle of the present invention.

Referring to the figure, 41 indicates a tube having its grid 42 connected with an inductance 43 and condenser 44, which are of such sizes that, taking into account the grid to filament capacity of the detector tube and the distributed capacity of the coil, the path from the grid electrode to the filament electrode which must be traversed by the rectified current is tuned to offer a very high impedance to the frequency of this intermediate or rectified current, it being understood that condenser 44 is usually made of a capacity as small as possible while still remaining in excess of three or five times the filament-to-grid capacity of the tube 41. The detector tube 41 is indicated as at least partially neutralized by the Rice system, the plate 45 feeding back to condenser 46 to inductance 43 to oppose the regenerated voltage. 46ª indicates a source of input, such as a transformer aerial and ground or loop to the circuit for imposing thereon a radio signal, and 47 indicates a form of oscillator circuit coupled with the grid circuit of tube 41 for applying a locally generated current to the detector tube 41 to aid in producing the intermediate or beat frequency for the receiver. It is understood that such system may be used for producing intermediate frequency either higher or lower than the frequency of the input signal, and that the detector may operate either by the so-called beat phenomena or may operate to produce a rectified current of the sum of the frequencies of the input frequency and the frequency of the oscillator 47. The detector tube 41 is indicated as connected in a conventional way to a radio frequency amplifier 48 of the converted or intermediate frequency, and said amplifier 48 is indicated as coupled in the conventional way to a detector 49 for detecting the audio frequency component of the signal being received. Said detector 49 may employ the detector system of the present invention or the usual grid leak-condenser system, such system being effective for detecting audio frequencies. The detector is also indicated as connected as usual with an audio frequency amplifier 51.

While the forms of the invention herein described are well adapted for carrying out the objects of the present invention, it is understood that the invention is capable of numerous modifications, and the invention therefore includes all such modifications and changes as come within the scope of the following appended claims.

I claim:—

1. A system for detecting oscillatory energy which comprises, a vacuum rectifying tube with input terminals, an input circuit connected therewith, and an output circuit for said rectifier, said input circuit including inductance condenser combination which is operated to establish resonance in the input circuit at the frequency of the rectified current in the output circuit, whereby to provide a high impedance in the input circuit to the rectified current flowing in said circuit, said inductance condenser combination offering a low impedance to the unrectified current in the input circuit.

2. An apparatus for detecting oscillatory energy which comprises, a vacuum tube, an input circuit for impressing the voltage for the energy to be detected across the filament and grid of said tube, an output circuit for said tube, said input circuit having an inductance condenser combination, the combination offering a low impedance to the frequency of the oscillations to be rectified and being adapted to establish resonance with the rectified current in the output circuit of the tube, and means for applying to the grid from the plate voltage counter to the regenerated voltage of the rectified current.

3. A frequency changing system comprising a detector, an input circuit for imposing oscillatory energy across the filament and grid of said detector, means in said input circuit for imposing locally generated oscillatory energy across the filament and grid of said detector, an inductance capacity combination in the input circuit adapted to bring said circuit in resonance with the rectified current to be produced, said inductance capacity combination offering a low impedance to the input oscillatory energy and the locally generated oscillatory energy.

4. An apparatus of the class described comprising a vacuum tube having grid, filament and plate electrodes, a circuit interconnecting the grid and filament electrodes including means for passing a small direct current, means in said circuit for bringing said circuit in resonance with the rectified current to be produced, means in said circuit for by-passing the frequency to be converted, and means for imposing the rectified current from the plate circuit upon said first mentioned circuit.

5. A system for detecting oscillatory energy which comprises, a vacuum rectifying tube with input terminals and a circuit connected between said input terminals, which circuit includes means to impress the signal voltage on the input terminals of the tubes, said circuit also including means, which, in conjunction with the tube's effective input capacity, is operative to establish resonance in said circuit with a component of the rectified current, thereby to provide a high impedance in the input circuit to the desired component of the rectified signal current flowing in said circuit connecting the input terminals.

Signed at Stanford University, Cal., this 17th day of February, 1927.

FREDERICK EMMONS TERMAN.